United States Patent
Flanigan

(10) Patent No.: US 8,021,134 B2
(45) Date of Patent: Sep. 20, 2011

(54) COMPRESSOR SLIDE VALVE SUPPORT

(75) Inventor: Paul J. Flanigan, Cicero, NY (US)

(73) Assignee: Carrier Corporation, Farmington, CT (US)

( * ) Notice: Subject to any disclaimer, the term of this patent is extended or adjusted under 35 U.S.C. 154(b) by 349 days.

(21) Appl. No.: 12/374,579

(22) PCT Filed: Oct. 16, 2006

(86) PCT No.: PCT/US2006/040466
§ 371 (c)(1),
(2), (4) Date: Jan. 21, 2009

(87) PCT Pub. No.: WO2008/069773
PCT Pub. Date: Jun. 12, 2008

(65) Prior Publication Data
US 2009/0280017 A1    Nov. 12, 2009

(51) Int. Cl.
  F03C 2/00 (2006.01)
  F03C 4/00 (2006.01)
  F04C 18/00 (2006.01)
(52) U.S. Cl. .................. 418/201.2; 418/102; 418/201.1
(58) Field of Classification Search .................. 418/102, 418/201.1, 201.2, 270; 384/43–45; 464/168; 417/310
See application file for complete search history.

(56) References Cited

U.S. PATENT DOCUMENTS

| | | | | |
|---|---|---|---|---|
| 2,058,331 | A | * | 10/1936 | Long .............................. 166/176 |
| 3,432,089 | A | * | 3/1969 | Schibbye .................... 418/201.2 |
| 3,545,826 | A | | 12/1970 | Magee et al. |
| 3,734,653 | A | * | 5/1973 | Edstrom et al. ............ 418/201.2 |
| 3,756,753 | A | * | 9/1973 | Persson et al. ............. 418/201.2 |
| 3,936,239 | A | * | 2/1976 | Shaw .......................... 418/201.2 |
| 4,249,866 | A | | 2/1981 | Shaw et al. |
| 4,909,716 | A | * | 3/1990 | Orosz et al. ................ 418/201.2 |
| 5,135,374 | A | * | 8/1992 | Yoshimura et al. ........ 418/201.2 |
| 6,168,313 | B1 | | 1/2001 | Edelmann et al. |
| 6,302,668 | B1 | | 10/2001 | Lee |
| 6,739,853 | B1 | | 5/2004 | Tang et al. |
| 7,798,793 | B2 | * | 9/2010 | Shoulders .................. 418/201.2 |
| 2004/0109782 | A1 | * | 6/2004 | Tang et al. ................. 418/201.2 |
| 2006/0008375 | A1 | * | 1/2006 | Hasegawa .................. 418/201.2 |
| 2008/0095653 | A1 | | 4/2008 | Shoulders |

FOREIGN PATENT DOCUMENTS

JP    59119084 A    7/1984

OTHER PUBLICATIONS

SKF Inch Linear Bearing Series, SKF USA, Pennsylvania, 2002.

* cited by examiner

*Primary Examiner* — Theresa Trieu
(74) *Attorney, Agent, or Firm* — Bachman & LaPointe, P C.

(57) ABSTRACT

A compressor (20) has an unloading slide valve (100). The valve has a valve element (102) having a range between a first condition and a second condition, the second condition being unloaded relative to the first condition. A first surface (200) of the valve element (102) is in sliding engagement with a second surface (202) of the housing (22) during movement between the first and second conditions. The valve element is coupled to an actuating piston (124). The compressor includes a linear bearing (132) guiding a piston shaft (122).

20 Claims, 5 Drawing Sheets

COMPRESSOR SLIDE VALVE SUPPORT

BACKGROUND OF THE INVENTION

The invention relates to compressors. More particularly, the invention relates to refrigerant compressors.

Screw-type compressors are commonly used in air conditioning and refrigeration applications. In such a compressor, intermeshed male and female lobed rotors or screws are rotated about their axes to pump the working fluid (refrigerant) from a low pressure inlet end to a high pressure outlet end. During rotation, sequential lobes of the male rotor serve as pistons driving refrigerant downstream and compressing it within the space between an adjacent pair of female rotor lobes and the housing. Likewise sequential lobes of the female rotor produce compression of refrigerant within a space between an adjacent pair of male rotor lobes and the housing. The interlobe spaces of the male and female rotors in which compression occurs form compression pockets (alternatively described as male and female portions of a common compression pocket joined at a mesh zone). In one implementation, the male rotor is coaxial with an electric driving motor and is supported by bearings on inlet and outlet sides of its lobed working portion. There may be multiple female rotors engaged to a given male rotor or vice versa.

When one of the interlobe spaces is exposed to an inlet port, the refrigerant enters the space essentially at suction pressure. As the rotors continue to rotate, at some point during the rotation the space is no longer in communication with the inlet port and the flow of refrigerant to the space is cut off. After the inlet port is closed, the refrigerant is compressed as the rotors continue to rotate. At some point during the rotation, each space intersects the associated outlet port and the closed compression process terminates. The inlet port and the outlet port may each be radial, axial, or a hybrid combination of an axial port and a radial port.

It is often desirable to temporarily reduce the refrigerant mass flow through the compressor by delaying the closing off of the inlet port (with or without a reduction in the compressor volume index) when full capacity operation is not required. Such unloading is often provided by a slide valve having a valve element with one or more portions whose positions (as the valve is translated) control the respective suction side closing and discharge side opening of the compression pockets. The primary effect of an unloading shift of the slide valve is to reduce the initial trapped suction volume (and hence compressor capacity); a reduction in volume index is a typical side effect. Exemplary slide valves are disclosed in U.S. Patent Application Publication No. 20040109782 A1 and U.S. Pat. Nos. 4,249,866 and 6,302,668 and PCT/US05/003819.

SUMMARY OF THE INVENTION

According to one aspect of the invention, a compressor has an unloading slide valve. The valve has a valve element having a range between a first condition and a second condition, the second condition being unloaded relative to the first condition. A first surface of the valve element is in sliding engagement with a second surface of the housing during movement between the first and second conditions. The compressor includes a linear bearing guiding a shaft coupling the valve element to an actuating piston.

In various implementations, the bearing may be a multi-circuit ball bearing. The bearing may be provided in a remanufacturing of a compressor or the reengineering of a compressor configuration from an initial baseline configuration. The remanufacturing or reengineering may include elimination of one or more support structures such as discharge plenum shelves and piston guide seals.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
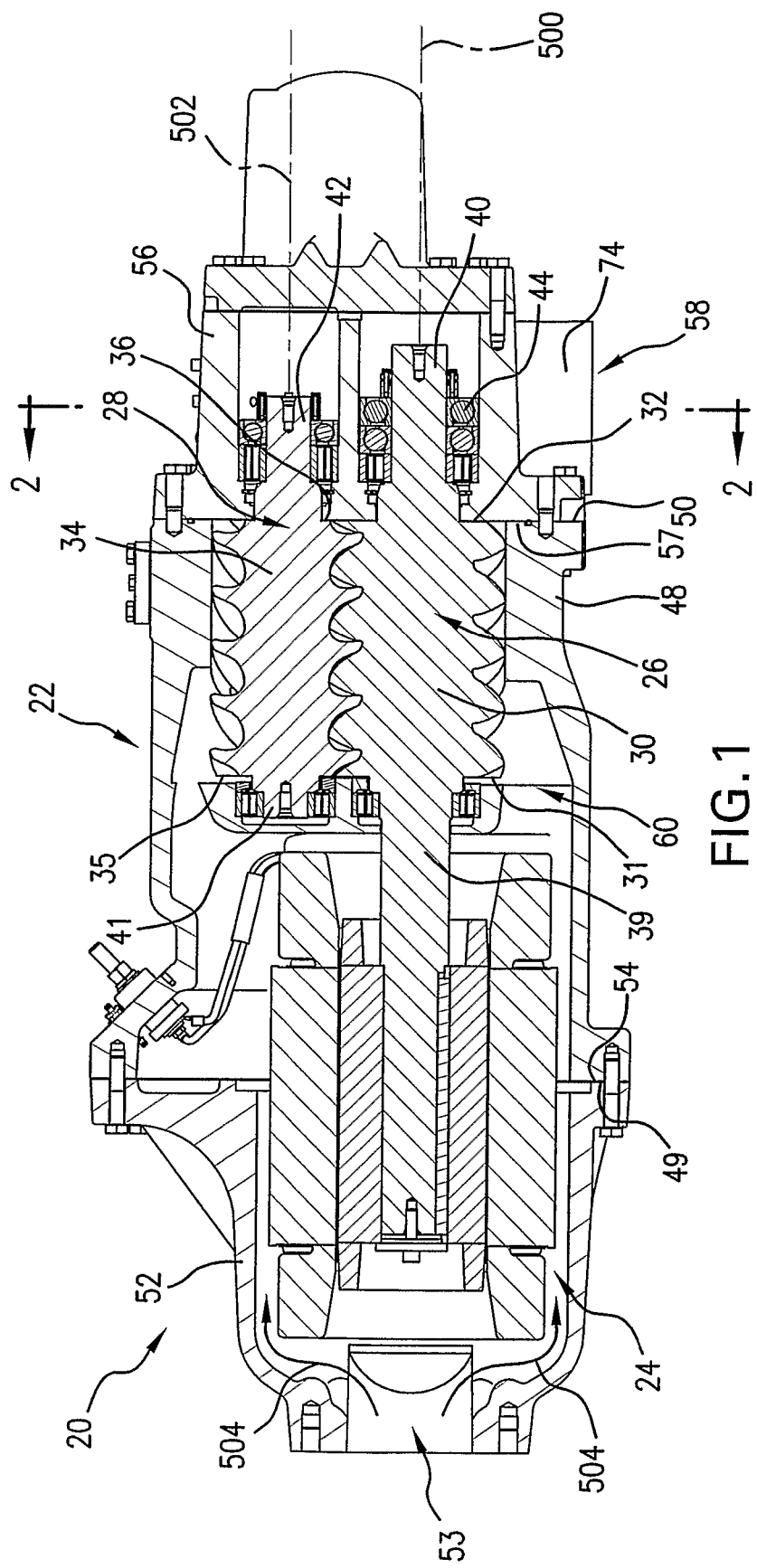
FIG. 1 is a longitudinal sectional view of a compressor.

FIG. 1 shows a compressor 20. The illustrated compressor is merely exemplary of one basic compressor configuration which may be modified according to the present teachings. For example, the details that follow will reference an exemplary reengineering from a baseline configuration to a reengineered configuration. The compressor 20 has a housing assembly 22 containing a motor 24 driving rotors 26 and 28 having respective central longitudinal axes 500 and 502. In the exemplary embodiment, the rotor 26 has a male lobed body or working portion 30 extending between a first end 31 and a second end 32. The working portion 30 is enmeshed with a female lobed body or working portion 34 of the female rotor 28. The working portion 34 has a first end 35 and a second end 36. Each rotor includes shaft portions (e.g., stubs 39, 40, 41, and 42 unitarily formed with the associated working portion) extending from the first and second ends of the associated working portion. Each of these shaft stubs is mounted to the housing by one or more bearing assemblies 44 for rotation about the associated rotor axis.

In the exemplary embodiment, the motor is an electric motor having a rotor and a stator. One of the shaft stubs of one of the rotors 26 and 28 may be coupled to the motor's rotor so as to permit the motor to drive that rotor about its axis. When so driven in an operative first direction about the axis, the rotor drives the other rotor in an opposite second direction. The exemplary housing assembly 22 includes a rotor housing 48 having an upstream/inlet end face 49 approximately midway along the motor length and a downstream/discharge end face 50 essentially coplanar with the rotor body ends 32 and 36. Many other configurations are possible.

The exemplary housing assembly 22 further comprises a motor/inlet housing 52 having a compressor inlet/suction port 53 at an upstream end and having a downstream face 54 mounted to the rotor housing downstream face (e.g., by bolts through both housing pieces). The assembly 22 further includes an outlet/discharge housing 56 having an upstream face 57 mounted to the rotor housing downstream face and having an outlet/discharge port 58. The exemplary rotor housing, motor/inlet housing, and outlet housing 56 may each be formed as castings subject to further finish machining.

Figure 2:
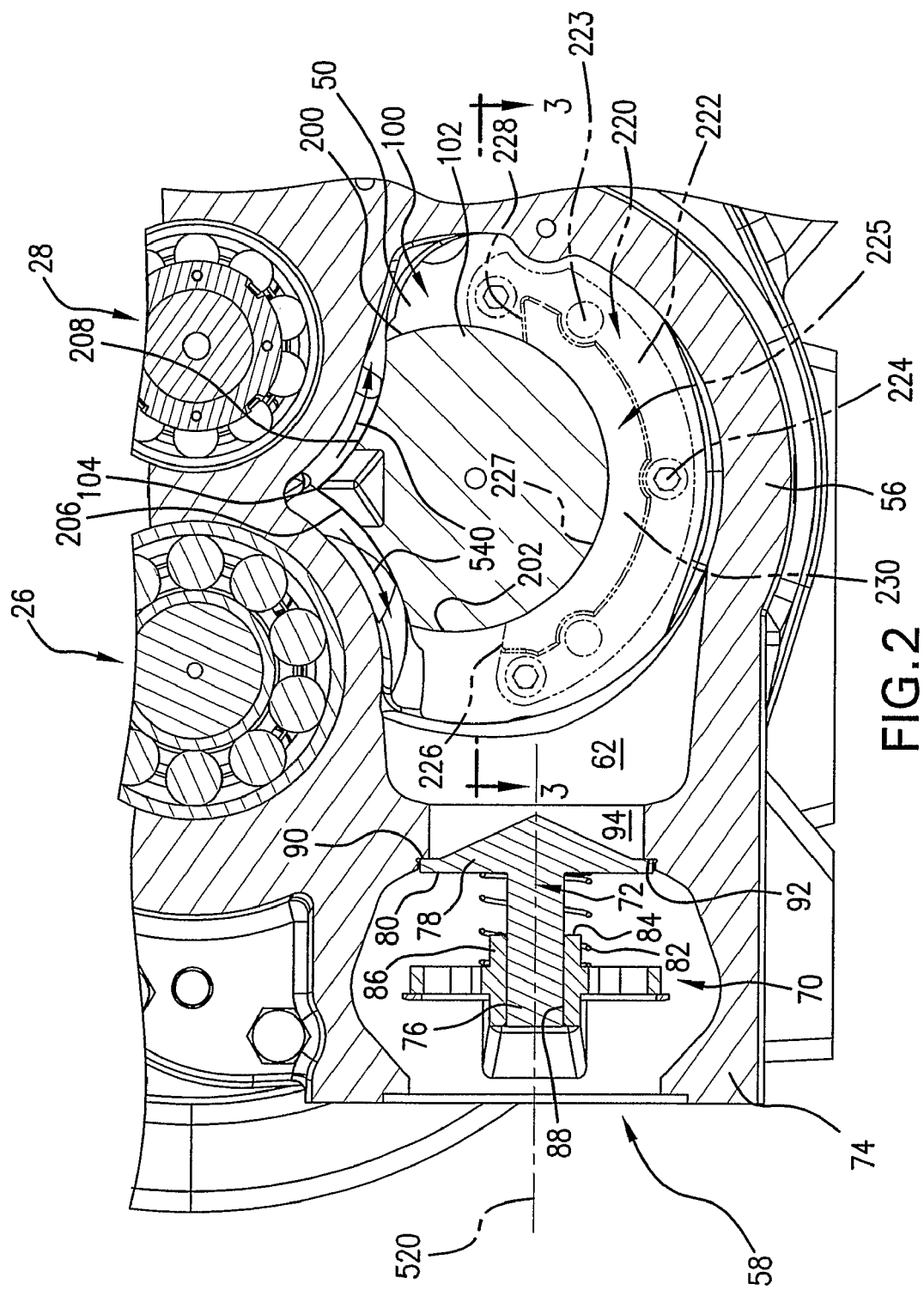
FIG. 2 is a transverse sectional view of a discharge plenum of the compressor of FIG. 1, taken along line 2-2 and showing a slide valve support.

Surfaces of the housing assembly 22 combine with the enmeshed rotor bodies 30 and 34 to define inlet and outlet ports to compression pockets compressing and driving a refrigerant flow 504 from a suction (inlet) plenum 60 to a discharge (outlet) plenum 62 (FIG. 2). A series of pairs of male and female compression pockets are formed by the housing assembly 22, male rotor body 30 and female rotor body 34. Each compression pocket is bounded by external surfaces of enmeshed rotors, by portions of cylindrical surfaces of male and female rotor bore surfaces in the rotor case and continuations thereof along a slide valve, and portions of face 57.

FIG. 2 shows further details of the exemplary flowpath at the outlet/discharge port 58. A check valve 70 is provided having a valve element 72 mounted within a boss portion 74 of the outlet housing 56. The exemplary valve element 72 is a front sealing poppet having a stem/shaft 76 unitarily formed with and extending downstream from a head 78 along a valve axis 520. The head has a back/underside surface 80 engaging an upstream end of a compression bias spring 82 (e.g., a metallic coil). The downstream end of the spring engages an upstream-facing shoulder 84 of a bushing/guide 86. The bushing/guide 86 may be unitarily formed with or mounted relative to the housing and has a central bore 88 slidingly accommodating the stem for reciprocal movement between an open condition (not shown) and a closed condition of FIG. 2. The spring 82 biases the element 72 upstream toward the closed condition. In the closed condition, an annular peripheral seating portion 90 of the head upstream surface seats against an annular seat 92 at a downstream end of a port 94 from the discharge plenum.

For capacity control/unloading, the compressor has a slide valve 100 having a valve element 102. The valve element 102 has a portion 104 along the mesh zone between the rotors (i.e., along the high pressure cusp). The exemplary valve element has a first portion 106 (FIG. 3) at the discharge plenum and a second portion 108 at the suction plenum. The valve element is shiftable to control compressor capacity to provide unloading. The exemplary valve is shifted via linear translation parallel to the rotor axes.

Figure 3:
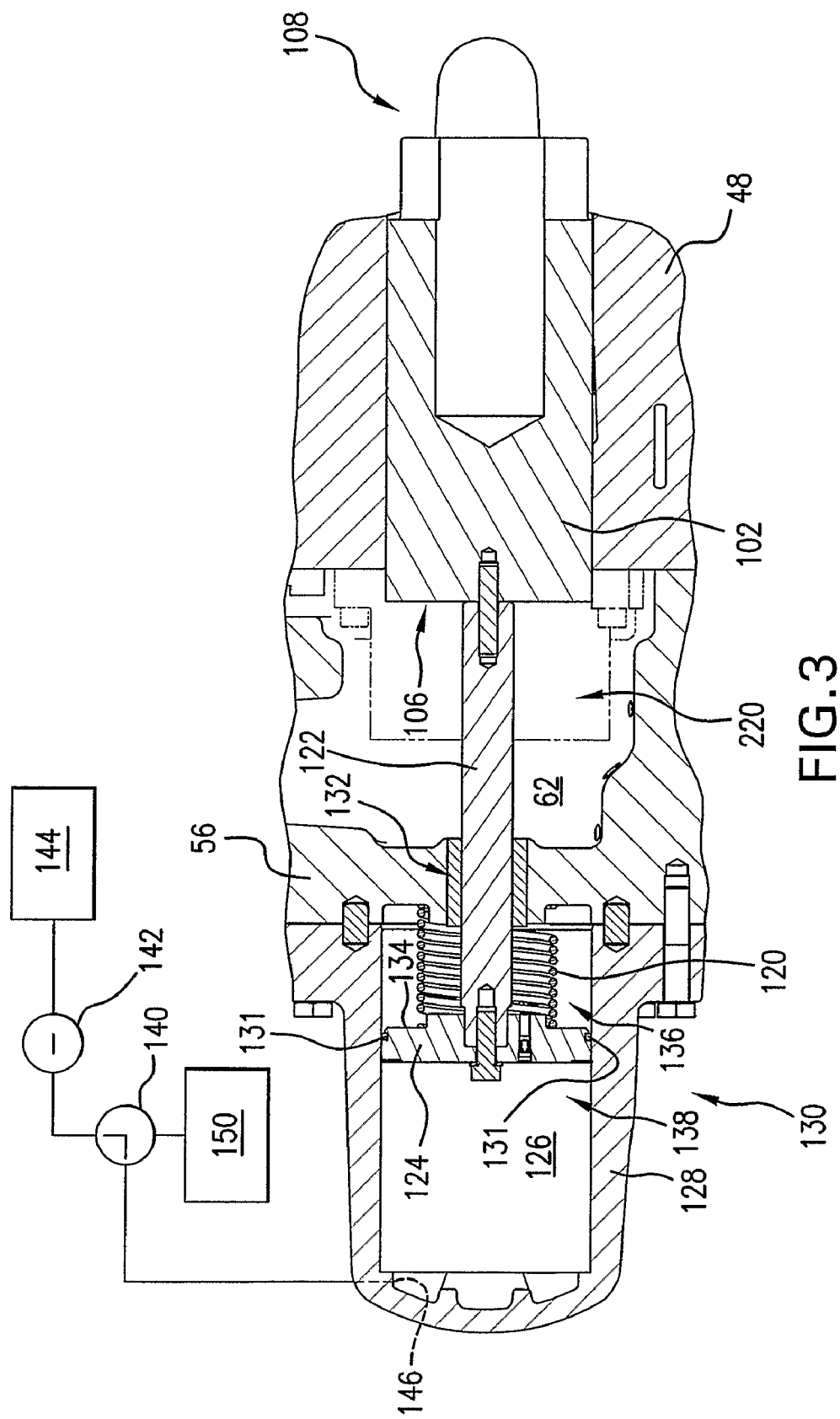
FIG. 3 is a sectional view of a slide valve assembly of the discharge plenum of FIG. 2 in a fully loaded condition, taken along line 3-3.
Figure 4:
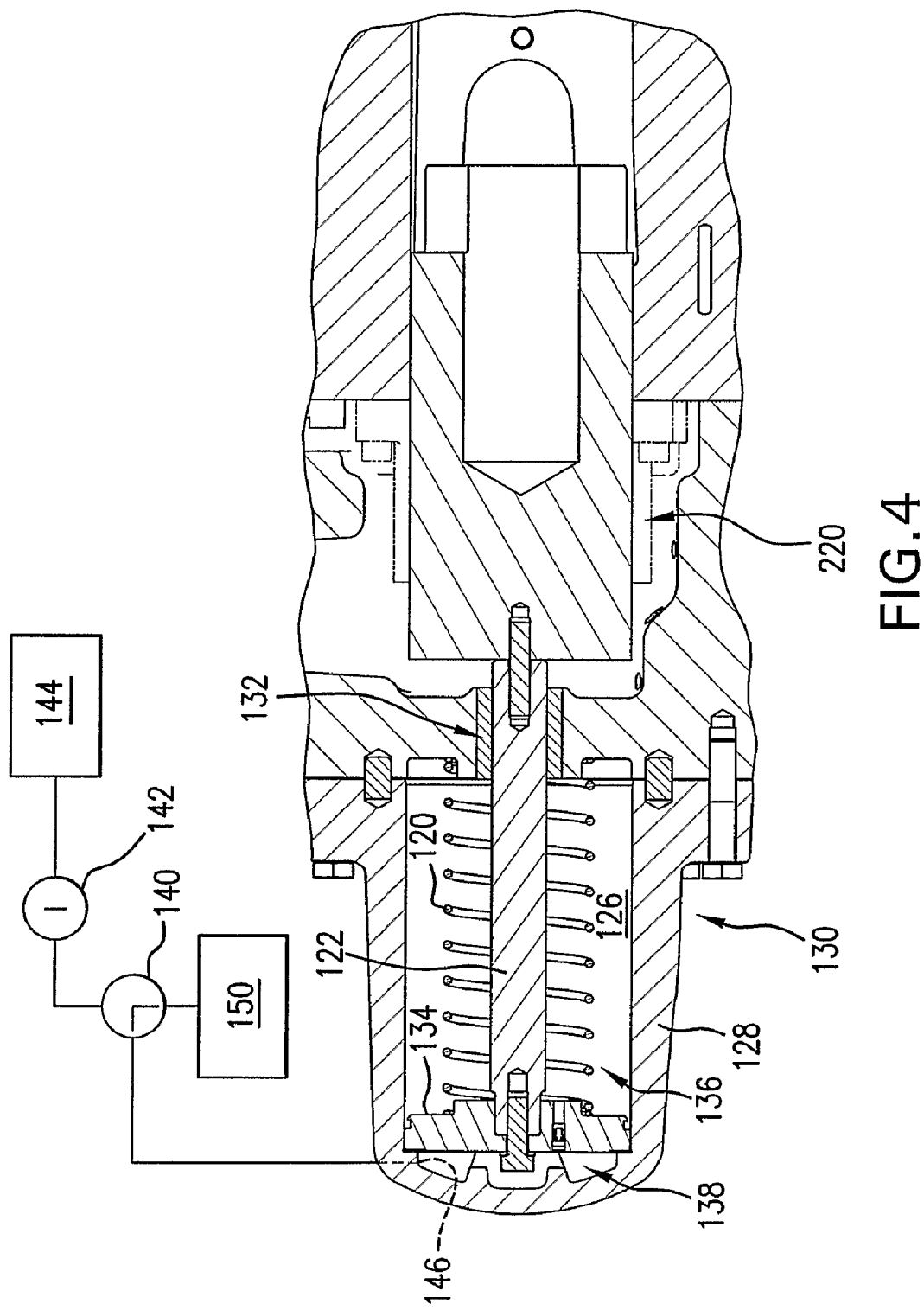
FIG. 4 is a view of the slide valve of FIG. 3 in a relatively unloaded condition.

FIG. 3 shows the valve element at an upstream-most position in its range of motion. In this position, the compression pockets close relatively upstream and capacity is a relative maximum (e.g., at least 90% of a maximum displacement volume for the rotors, and often about 99%). FIG. 4 shows the valve element shifted to a downstream-most position. Capacity is reduced in this unloaded condition (e.g., to a displacement volume less than 40% of the FIG. 3 displacement volume or the maximum displacement volume, and often less than 30%). In the exemplary slide valve, shifts between the two positions are driven by a combination of spring force and fluid pressure. A main spring 120 biases the valve element from the loaded to the unloaded positions. In the exemplary valve, the spring 120 is a metal coil spring surrounding a shaft 122 coupling the valve element to a piston 124. The piston is mounted within a bore (interior) 126 of a cylinder 128 formed in a slide case element 130 attached to the outlet case. The piston may carry a pressure seal 131 to engage/seal with the bore.

As is discussed further below, the reengineering may provide a linear bearing 132 in the outlet case. The shaft 122 passes through and is supported/guided by the bearing 132. The bearing may replace a clearance aperture of the baseline configuration. The spring is compressed between an underside 134 of the piston and the outlet case. A proximal portion 136 of the cylinder interior is in pressure-balancing fluid communication with the discharge plenum via clearance between the aperture and shaft. A headspace 138 is coupled via electronically-controlled solenoid valves 140 and 142 (shown schematically) to one of: a high pressure fluid source 144 at or near discharge conditions (e.g., to an oil separator); and a low pressure drain/sink 150 which may be at or near suction conditions (e.g., an oil return). A port 146 is schematically shown in the cylinder at the headspace at the end of a conduit network connecting the valves 140 and 142. In an exemplary implementation, the portions of the conduit network may be formed within the castings of the housing components.

The loaded position/condition of FIG. 3 can be achieved by coupling the headspace 138 to the source 144 and isolating it from drain/sink 150 by appropriate control of valves 140 and 142. The unloaded position/condition of FIG. 4 can be achieved by coupling the headspace 138 to the drain/sink 150 and isolating it from source 144 by appropriate control of valves 140 and 142. Intermediate (partly loaded) positions, not shown, can be achieved by alternating connection of headspace 138 to either the source 144 or the drain/sink 150 using appropriately chosen spans of time for connection to each, possibly in combination with isolating the headspace 138 from both source 144 and drain/sink 150 for an appropriately chosen span of time (e.g., via appropriate modulation techniques).

Returning to FIG. 2, the interfitting of the slide valve element 102 and the rotor housing is seen. The slide valve element 102 has a circular cylindrical exterior surface portion 200 singly convex. This is closely accommodated within a rotor housing bore defined by a circular cylindrical interior surface portion 202 extending from the rotor housing end surface 50. During loading and unloading, there is linear sliding interaction between the surfaces 200 and 202. FIG. 2 further shows concave circular cylindrical exterior surface portions 206 and 208 of the element 102 in close proximity to the lobes of the rotors 26 and 28, respectively. The sliding interaction between the surfaces 200 and 202 may potentially damage one or both of the surfaces 200 and 202. It may, accordingly, be desirable to provide additional support for the valve element 102.

The baseline compressor configuration has a shelf-like support member 220 (FIG. 2) located in the discharge plenum 62. The support member 220 provides additional support to the valve element 102. The exemplary support 220 includes a mounting flange 222 aligned by studs 223 and fastened against the rotor housing discharge end surface 50 by fasteners (e.g., bolts) 224. Extending from the opposite surface of the flange 222, is a sleeve segment 225 unitarily formed therewith. The sleeve 225 has an upper/inboard surface 227 locally aligned with the surface 202 to combine therewith to engage the surface 200. The sleeve has first and second longitudinal edges 226 and 228 and a distal end or rim 230. An exemplary circumferential span along the surface 200 between the edges 226 and 228 is 90-180°, more narrowly 120-160°.

By adding support provided by the bearing 132, the reengineering may allow removal/elimination or other reduction of the support 220 and its associated studs, fasteners, and other components (if any). On the opposite side of the bearing 132, the reengineering may also remove some aspect of the baseline support. For example, the reengineering may preserve the pressure seal 131. An exemplary seal 131 is a spring-energized polymeric seal ring (e.g., a C-sectioned PTFE full ring whose opening faces the proximal portion 136 of the cylinder interior such as is available as the model 15 reciprocating seal from Bal Seal Engineering Co., Inc., Foothill Ranch, Calif., US). The reengineering may, however, remove an additional guide seal (e.g., a spring energized PTFE split band seal) and its associated groove adjacent of the seal 131 (e.g., to the piston face side). Removal of the guide seal and its groove may further allow thinning/shortening of the piston.

Figure 6:
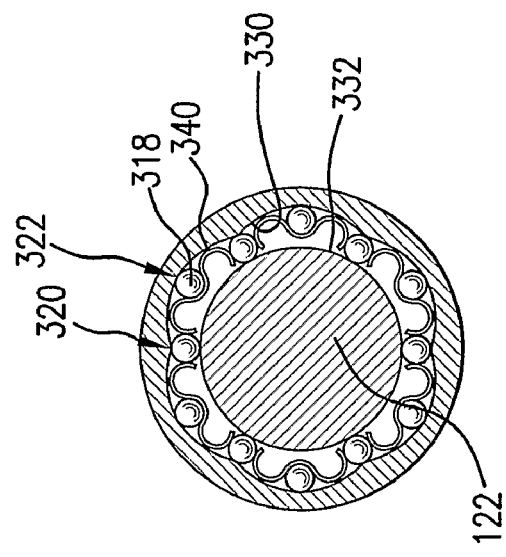
FIG. 6 is a transverse sectional view of the bearing and shaft of FIG. 5.
Figure 5:
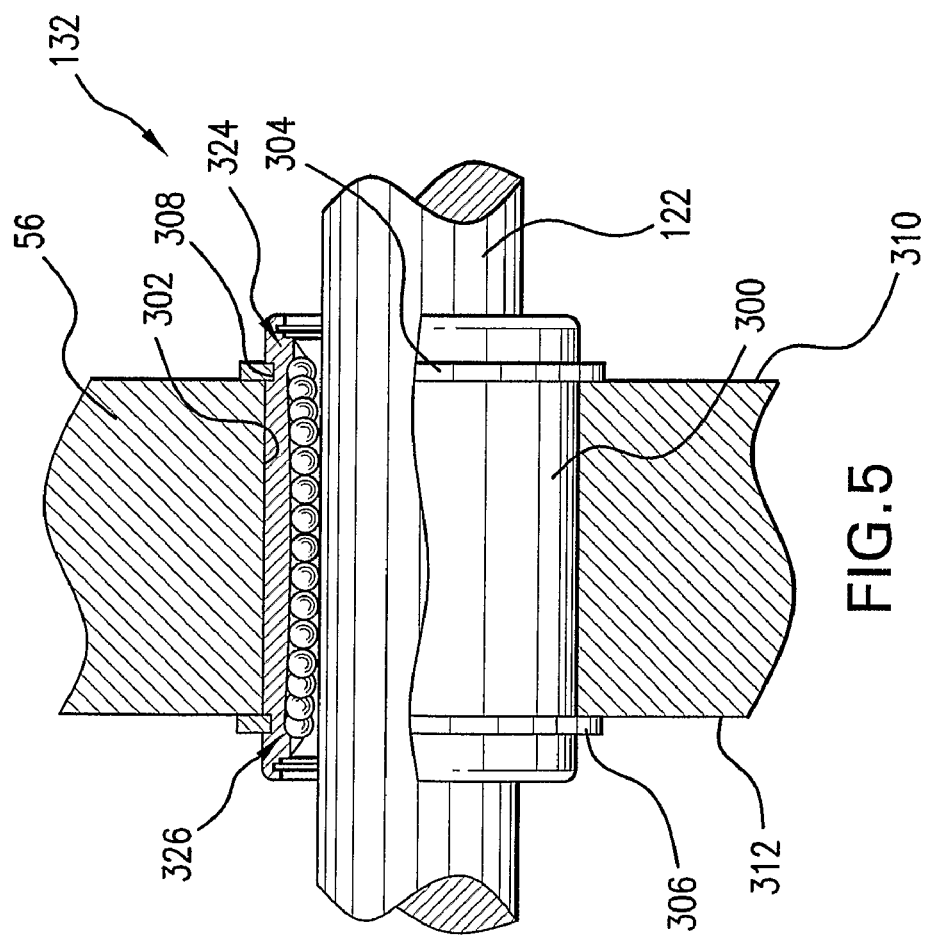
FIG. 5 is a longitudinal cutaway view of a shaft and linear bearing of the slide valve of FIG. 3.

FIGS. 5 and 6 show further details of an exemplary linear bearing 132. The bearing 132 has a body or exterior race 300 mounted (e.g., by interference/press fit) in an aperture 302 in the discharge housing 56. The aperture 302 may represent an enlargement of the baseline clearance aperture through which the shaft 122 freely passes in the baseline configuration. In the exemplary reengineering, the shaft 122 may be of circular cross-section, replacing a shaft of hexagonal cross-section. The exemplary race 300 is held in position via snap rings 304 and 306 captured in grooves 308 in the race 302 along respective inboard and outboard faces 310 and 312 of the discharge housing 56.

The exemplary linear bearing 132 is a ball-type rolling element bearing wherein a plurality of tracks/circuits each accommodate an associated plurality of ball bearings 318. An exemplary track count is five or six. Exemplary linear bearings are available from SKF USA, Inc. of Norristown, Pa., US as, for example, the LBXR series. Bearings of this general type are shown in U.S. Pat. No. 6,168,313 assigned to SKF Linearsysteme GmbH. The illustrated FIG. 6 example includes six tracks each of which has an active leg 320 and an adjacent (immediately clockwise as viewed in FIG. 6) return leg 322. Each track includes a first end 324 (FIG. 5) and a second end 326.

An overall planform of each exemplary track is close to obround with longitudinal legs and semi-circular ends. The race interior surface 330 is contoured so that the balls 318 are relatively radially inward along the active leg 320 so as to contact the shaft exterior surface 332. The race interior surface 330 is recessed relatively outward along the return legs 322 with transitions along the ends. The radially outward position of the return leg allows a guide/retainer 340 to hold the balls 318 spaced-apart from the shaft exterior surface 322 while along the return leg.

In operation, when the shaft 122 is translated in a given axial direction, those balls 318 along the active leg 320 will be in rolling engagement with both the shaft exterior surface 322 and the race interior surface 330. Accordingly, those balls will move in the same direction as the shaft but half the distance and at half the velocity. Thus, the translation will shift the balls along the active leg in a direction from one end to the other. For example, a leftward movement of the shaft in FIG. 5 will bring the balls toward the second end 326. At the second end 326, the balls become disengaged from the shaft and turn back along the return leg 318 toward the first end 324. At the first end 324, the balls return to the first leg 320 and the process may continue. Accordingly, the balls in the active legs provide radial support and guidance to the shaft 122.

The exemplary reengineering may reduce manufacturing costs (e.g., part and/or assembly labor costs). The cost savings may be achieved by elimination of one or more of the support shelf and its associated hardware and the piston guide seal. These may outweigh the added cost of the linear bearing and its associated labor.

One or more embodiments of the present invention have been described. Nevertheless, it will be understood that various modifications may be made without departing from the spirit and scope of the invention. For example, in a reengineering or remanufacturing situation, details of the existing compressor configuration may particularly influence or dictate details of the implementation. Accordingly, other embodiments are within the scope of the following claims.

What is claimed is:

1. A compressor apparatus (20) comprising:
   a housing (22) having first (53) and second (58) ports along a flow path;
   one or more working elements (26; 28) cooperating with the housing to define a compression path between suction (60) and discharge (62) locations along the flow path;
   an unloading slide valve (100) having:
      a valve element (102) having a range between a first condition and a second condition, the second condition being unloaded relative to the first condition, a first surface (200) of the valve element (102) in sliding engagement with a second surface (202) of the housing (22) during movement between the first and second conditions;
      a cylinder (128) formed in a slide case (130);
      a piston (124) mounted within the cylinder; and
      a shaft (122) coupling the valve element to the piston, characterized by:
      a bearing (132) mounted to the housing and guiding the shaft (122).

2. The apparatus of claim 1 wherein:
   the bearing (132) is a linear bearing.

3. The apparatus of claim 1 wherein:
   the bearing (132) is a ball bearing.

4. The apparatus of claim 3 wherein the bearing comprises:
   a plurality of closed loop tracks, each having an active leg (320) and a return leg (322), the return leg radially outwardly offset form the active leg; and
   on each of the tracks, an associated plurality of balls (318).

5. The apparatus of claim 1 wherein:
   there is no support shelf (220) extending into the discharge location.

6. The apparatus of claim 1 wherein:
   the piston carries a single pressure seal (131).

7. The apparatus of claim 6 wherein:
   the single pressure seal is a full ring spring energized polymer seal.

8. The apparatus of claim 1 wherein:
   the piston lacks a guide seal.

9. The apparatus of claim 1 wherein:
   the range is a range of linear translation without rotation.

10. The compressor of claim 1 wherein the one or more working elements include:
   a male-lobed rotor (26) having a first rotational axis (500); and
   a female-lobed rotor (28) having a second rotational axis (502) and enmeshed with the male-lobed rotor.

11. The compressor of claim 10 wherein:
   in the first condition, the compressor is at least at 90% of a maximum displacement volume; and
   in the second condition, compressor is at less than 40% of the first condition displacement volume.

12. A method for remanufacturing a compressor (20) or reengineering a configuration of the compressor comprising:
   providing an initial such compressor or configuration having:
      a housing (22);
      one or more working elements (26; 28) cooperating with the housing to define a compression path between suction (60) and discharge (62) locations; and
      an unloading slide valve (100) having:
         a valve element (102) having a range between a first condition and a second condition, the second condition being unloaded relative to the first condition, a first surface (200) of the valve element (102) in sliding engagement with a second surface (202) of the housing (22) during movement between the first and second conditions; and an actuating piston (124) coupled to the valve element by a shaft (122); and adapting such compressor or configuration to include a bearing (132) supporting the shaft (122).

13. The method of claim 12 wherein:

the adapting includes eliminating a support (220) extending into a discharge plenum (62).

14. The method of claim 12 wherein:

the adapting includes modifying or eliminating a support (220) extending into a discharge plenum (62).

15. The method of claim 14 wherein the adapting comprises enlarging an aperture in a discharge housing to accommodate the bearing (132).

16. The method of claim 14 wherein the adapting comprises eliminating a guide seal carried by a piston (124) of the slide valve.

17. The method of claim 14 wherein the adapting comprises changing a cross-sectional shape of a shaft (122) of the valve element.

18. The method of claim 12 wherein the adapting comprises enlarging an aperture in a discharge housing to accommodate the bearing (132).

19. The method of claim 12 wherein the adapting comprises eliminating a guide seal carried by a piston (124) of the slide valve.

20. The method of claim 12 further comprising:

manufacturing the reengineered compressor.

* * * * *